United States Patent [19]

Mueller

[11] 4,199,154
[45] Apr. 22, 1980

[54] LABYRINTH SEALING SYSTEM

[75] Inventor: Klaus W. Mueller, Yonkers, N.Y.

[73] Assignee: Stauffer Chemical Company, Westport, Conn.

[21] Appl. No.: 709,344

[22] Filed: Jul. 28, 1976

[51] Int. Cl.² .......................................... F16J 15/44
[52] U.S. Cl. ...................................... 277/53; 277/133; 277/59; 277/173; 415/110; 432/115; 415/172 A
[58] Field of Search .................. 432/115, 242; 34/242; 415/110, 112, 172 A; 277/53–57, 133, 134, 59, 58, 173–177, 138, 198, 30

[56] References Cited

U.S. PATENT DOCUMENTS

| 853,059 | 5/1907 | Bunge | 277/57 |
|---|---|---|---|
| 1,009,425 | 11/1911 | Ljungstrom | 277/57 X |
| 1,354,235 | 9/1920 | Bonom | 277/57 |
| 1,835,361 | 12/1931 | Wiberg | 415/112 |
| 2,159,766 | 5/1939 | Larrecq | 277/57 |
| 2,479,038 | 8/1949 | Cronstedt | 277/57 X |
| 2,646,999 | 7/1953 | Barske | 277/133 X |
| 3,239,193 | 3/1966 | Kerensky | 415/110 |
| 3,501,089 | 3/1970 | Alford | 415/112 X |
| 3,512,788 | 5/1970 | Kilbane | 415/110 X |
| 3,724,887 | 4/1973 | Roberts | 432/115 X |
| 3,907,457 | 9/1975 | Nakamura et al. | 277/57 X |
| 3,957,277 | 5/1976 | Margnelli | 415/172 A X |

FOREIGN PATENT DOCUMENTS

| 583211 | 9/1959 | Canada | 277/133 |
|---|---|---|---|
| 665296 | 9/1938 | Fed. Rep. of Germany | 277/57 |
| 202207 | 9/1965 | Fed. Rep. of Germany | 432/115 |
| 470015 | 3/1952 | Italy | 277/57 |
| 69334 | 5/1930 | Sweden | 277/56 |
| 69833 | 8/1915 | Switzerland | 277/56 |
| 147220 | 8/1931 | Switzerland | 277/57 |
| 15487 | of 1912 | United Kingdom | 277/57 |
| 17201 | of 1913 | United Kingdom | 277/57 |
| 324426 | 1/1930 | United Kingdom | 277/57 |
| 400466 | 10/1933 | United Kingdom | 277/57 |
| 667544 | 3/1952 | United Kingdom | 277/56 |

Primary Examiner—Robert S. Ward, Jr.
Attorney, Agent, or Firm—Roger S. Benjamin

[57] ABSTRACT

A labyrinth sealing system for sealing the inner space of an apparatus defined by two interengaged members, wherein one member is movable with respect to the other. The sealing system includes a first plurality of concentrically spaced ridges formed on one of said members, and a second plurality of concentrically spaced ridges formed on the other said member, the ridges of each said member arranged to engage each other in noncontacting fashion in the spaces between the ridges of the other said member.

1 Claim, 6 Drawing Figures

LABYRINTH SEALING SYSTEM

BACKGROUND OF THE INVENTION

This invention relates to sealing devices and more particularly to a labyrinth seal for rotary heating equipment.

Rotary heating equipment such as kilns, furnaces, dryers, roasters, and ovens usually comprise a cylindrical structure that is slightly inclined to the horizontal and rotatable upon suitable bearings. The cylindrical structure generally includes a stationary or fixed end portion, and a rotatable portion communicating with the fixed portion. Solid feed introduced into the cylindrical structure normally progresses through it by virtue of rotation, pressure, and slope of the cylinder. The finished product generally discharges at the stationary end.

The necessary heat supplied to the feed or contents of rotary equipment can be provided by direct or indirect heat transfer methods. Direct heat transfer refers to the addition of heat by direct exchange between flowing gas and solid feed by means of, for example, a combustion chamber.

Indirect heat transfer is characterized by a separation of the heating medium from physical contact with the solids by means of, for example, metal walls or tubes.

A number of different methods have been employed to seal rotary equipment to prevent gas and/or dust from leaking between the rotatable and stationary portions of the rotary apparatus. One known type of seal employs a compression ring or bar mounted on a wearing pad to form a contact seal. See Perry & Chilton, *Chemical Engineers' Handbook*, 5th Edition, Section 20, page 38 (McGraw-Hill, 1973). Other known seals include complex interengaging metal members in the form of heavy castings or fabrications, usually spring biased or lever biased against each other and their respective mountings.

Contact type seals are subject to constant wear and must be periodically replaced. The maintenance and repair of such seals is a cumbersome operation due to the complex nature of the seal components, as well as the difficulty in aligning the interengaging members. Also, it is usually necessary to shut down the equipment in order to repair and replace the seals, leading to costly down-times.

Perhaps, the one common drawback to the multitude of known contact type seals approaches is that most of these sealing devices depend upon frictional contact to achieve their sealing effect. This approach has proven to be impractical in maintaining a proper seal in view of the poor rotation precision of rotary kilns, contributed to by thermal deformation and thermal elongation or contraction of the rotary kiln per se. Deflected loads can result, and are discontinuously imposed on the sliding surface of the seal mechanism. Furthermore, non-metallic materials constituting the sliding face of the seal mechanism are subjected to high temperatures during the rotary kiln operation, resulting in the eventual breakdown and frequent replacement of the seal mechanism.

Efficient seals are essential for proper control and economical operation of rotary heating equipment. They reduce the entry of outside air. In some instances, complete containment of the enclosed system of rotating equipment is essential, as when toxic gases or solids are present. In other instances, entry of the external atmosphere into the apparatus could contaminate or react undesirably with the apparatus contents. It is also desirable for health reasons to prevent escape of dust and/or vapor from the equipment.

In contradistinction to contact type seals, labyrinth type seals perform a sealing function without frictional contact between the rotatable and the stationary portions of the heating equipment. One known type of labyrinth seal consists of an arrangement of axial rows of annular fins on the rotatable portion of the rotary kiln that mesh with alternately spaced axial rows of annular fins on the stationary portion of the kiln.

This type of labyrinth seal, although capable of preventing leakage, is not generally used on large diameter rotary equipment for a number of reasons. For example, due to the configuration of the fins, the outer cylinder must be of a split construction to enable its removal. In rotary equipment wherein cylinder diameters can exceed 10 feet, this type of construction makes it difficult to maintain proper alignment. Furthermore, labyrinth seals which have fins that are disposed axially, have little flexibility in terms of accommodating the angular and axial misalignment commonly encountered under operating conditions.

SUMMARY OF THE INVENTION

In accordance with the present invention, the noval labyrinth seal comprises noncontacting segment members provided on rotatable and stationary portions of the rotary heating equipment. The segment members interengage by means of concentric alternating grooves and ridges in noncontacting fashion. A fluid inlet provided on one of the segment members allows for the entry of a fluid sealing means, such as, for example steam, into the interface between the segment members. Under this arrangement, the labyrinth seal is capable of maintaining the integrity of the contents of the rotary heating equipment by sealing the inner space defined by the rotatable and stationary portions, thereby preventing leakage into or out of the equipment. The labyrinth seal of the present invention can also withstand greater axial and angular misalignment commonly encountered in rotary heating equipment, is substantially more durable and maintenance free than those known in the prior art.

DESCRIPTION OF THE DRAWINGS

In the accompanying drawings in which various embodiments of the invention are illustrated.

Corresponding reference numbers indicate corresponding parts throughout the several views of the drawings.

DESCRIPTION OF THE PREFERRED EMBODIMENT

Figure 1:
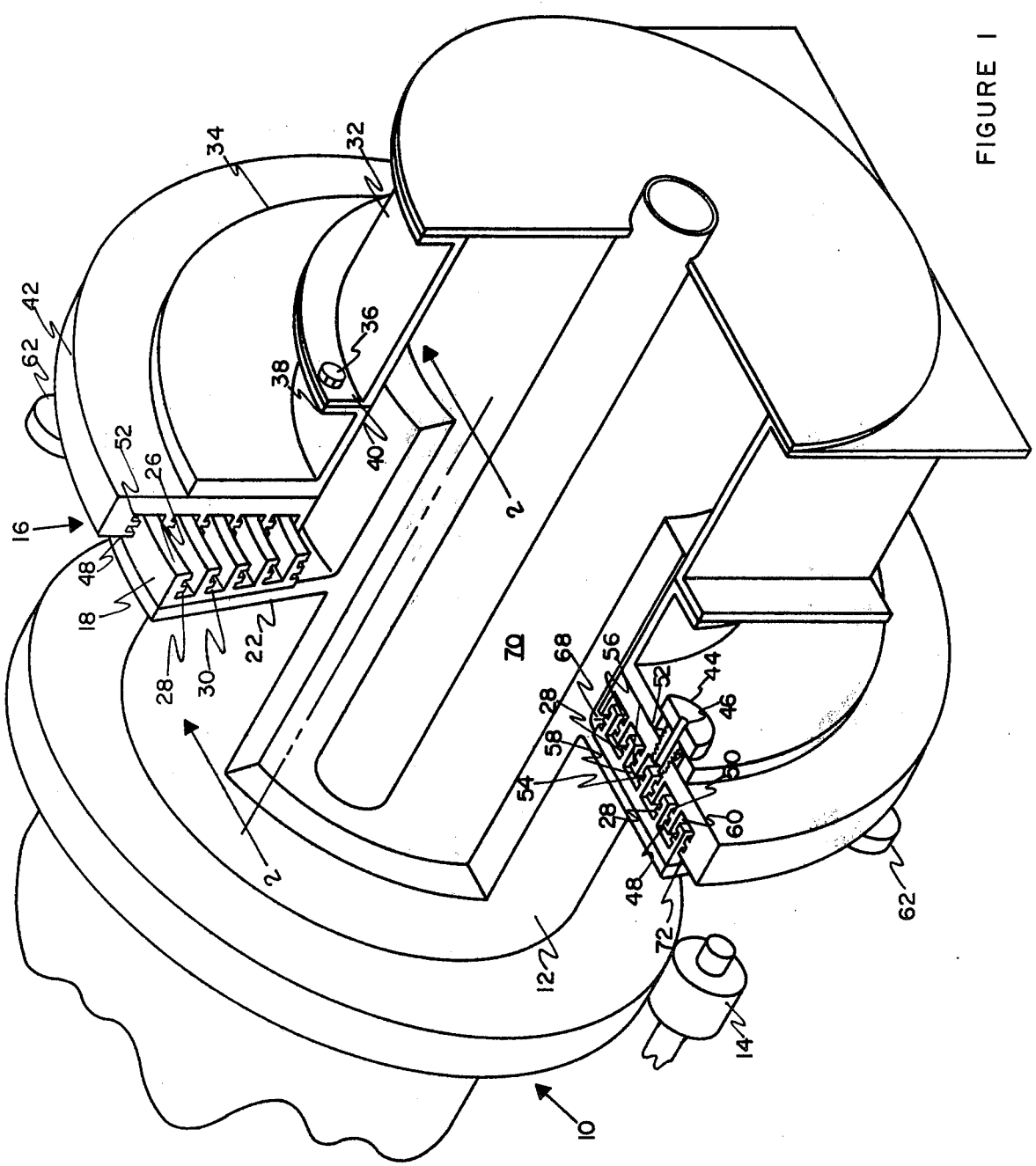
FIG. 1 is a perspective view of a rotary roaster or kiln incorporating one embodiment of the invention, a portion of the roaster being cut away.
Figure 2:
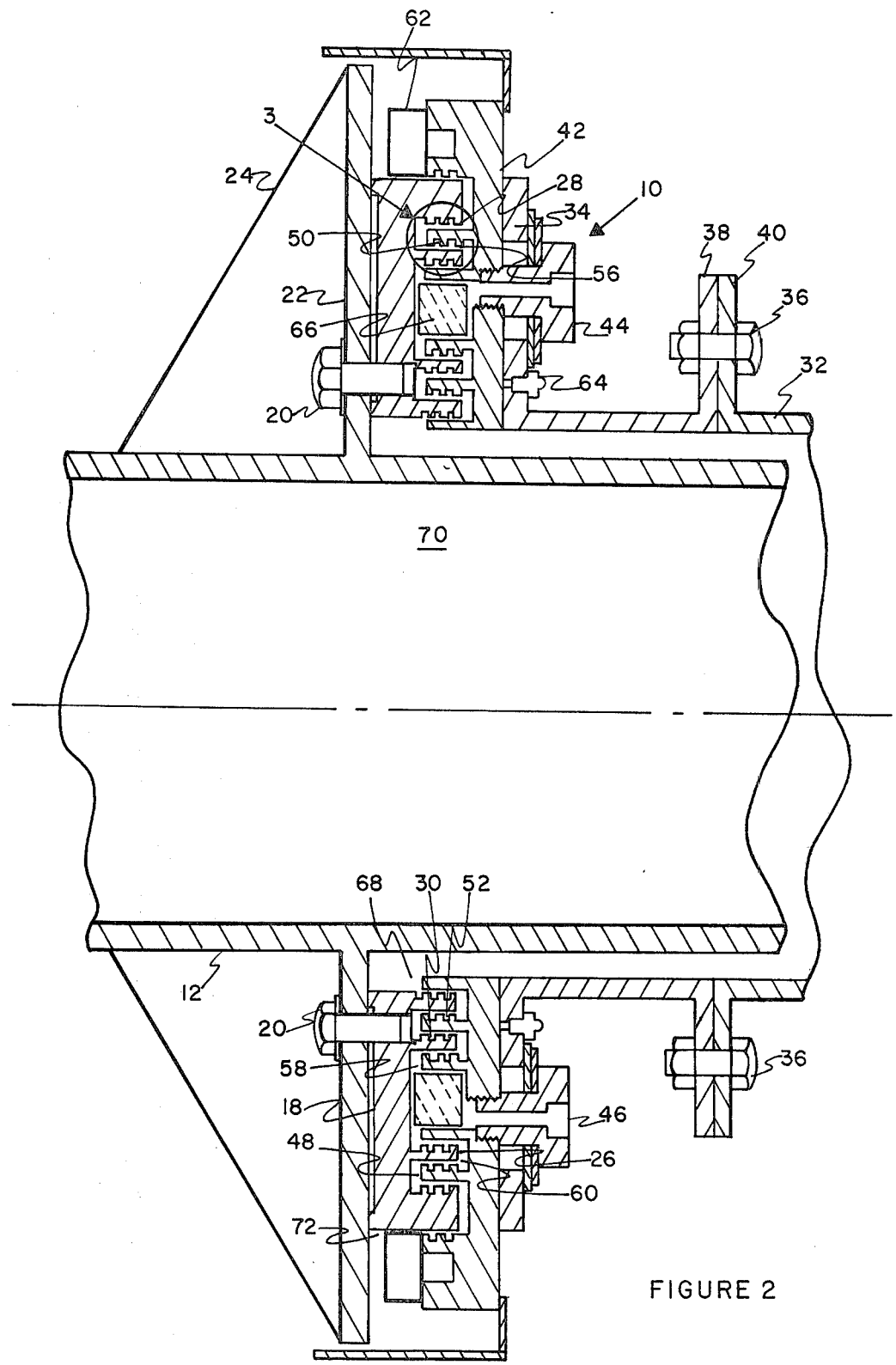
FIG. 2 is a sectional view taken along the line 2—2 in FIG. 1.
Figure 3:
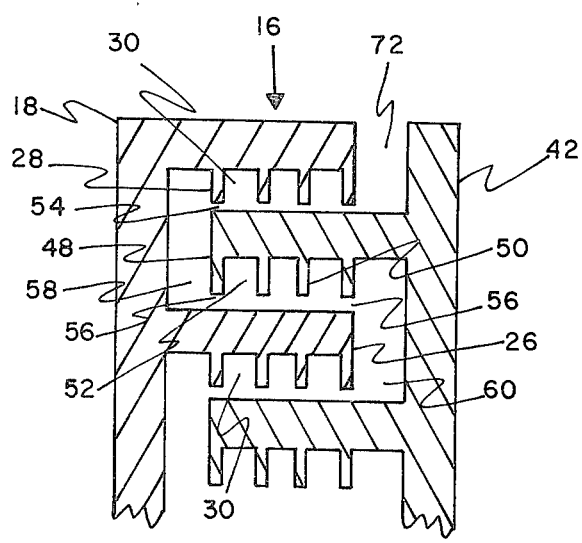
FIG. 3 is an enlarged fragmentary sectional view of portion 3 in FIG. 2.

Referring now to FIGS. 1, 2 and 3 of the drawings, a rotary kiln 10 comprises a cylindrical rotatable roaster body 12 mounted on suitable support means such as rollers 14. A labyrinth seal 16 on the kiln 10 comprises a rotatable segment 18 affixed to the roaster body 12 by a plurality of mounting bolts 20 in a mounting flange 22, having a reinforcing web 24 formed on the roaster body 12.

The rotatable segment 18 includes a plurality of concentrically spaced projecting ridges 26, with the inner radial surface of each ridge formed with a plurality of annular teeth 28. The spaces between the teeth 28 define a plurality of expansion chambers 30.

A fixed end portion 32 of the rotary kiln 10 includes an annular plate 34 affixed thereto by mounting bolts 36 provided in adjacent flanges 38 and 40.

The labyrinth seal 16 also comprises a stationary segment 42 mounted on the plate 34 by means of a plurality of threaded fittings 44, formed with an axial bore 46.

The stationary segment 42 is formed with a plurality of concentrically spaced projecting ridges 48 which project into the spaces between the ridges 26 of the rotatable segment 18. The inner radial surface of the ridges 48 are formed with a plurality of annular teeth 50. The spaces between the teeth 50 define a plurality of expansion chambers 52. The ridges 26 of the rotatable segment 18 project into the spaces between the ridges 48 of the stationary segment 42.

As is most clearly shown in FIG. 3, a plurality of throttling slots 54 are defined between the outer radial surface of ridges 48 and the free end portions of the teeth 28. A plurality of throttling slots 56, similar to the throttling slots 54, are defined between the outer radial surface of ridges 26 and the free end portion of the teeth 50. A plurality of terminal expansion chambers 58 are defined between the free end extremity of the ridges 48 and the rotatable segment 18. A plurality of terminal expansion chambers 60, similar to the terminal expansion chambers 58, are defined between the free end extermity of the ridges 26 and the stationary segment 42.

The stationary segment 42 includes a plurality of alignment rollers 62 rotatably mounted thereon beyond the periphery of the rotatable segment 18. As shown in FIG. 2, a plurality of lubricant fittings 64 are provided in the annular plate 34 adjacent to the stationary segment 42. Also shown in FIG. 2, an annular floating piston ring 66, formed of a suitable self-lubricating material, such as graphite, is sandwiched between the rotatable segment 18 and stationary segment 42.

An inner annular space 68 between the rotatable segment 18 and the stationary segment 42 communicates with the inner chamber 70 of the kiln 10. An outer annular space 72 between rotatable segment 18 and stationary segment 42 communicates with the external atmosphere.

In operation of the rotary kiln 10, a fluid sealing means such as steam furnished from a suitable steam supply (not shown) is connected to the axial bore 46 of the threaded fitting 44 in a conventional manner. After the steam enters the bore 46 it divides into two portions. One portion of the steam traverses a path into the kiln chamber 70 while the other portion of steam simultaneously traverses a path to the outside atmosphere.

A typical path traversed by the steam to the kiln chamber 70 is, for example, through the throttling slot 54 where the steam is accelerated. The throttled steam then passes into the expansion chamber 30 wherein it expands turbulently, resulting in a reduction of steam pressure. This process of throttling and expansion is repeated through successive throttling slots and expansion chambers, 54 and 30, respectively. The steam then enters the terminal expansion chamber 58, at the free end of the ridge 48, where it reverses direction and passes through a succession of throttling slots 56 and expansion chambers 52. The steam then enters the terminal expansion chamber 60, at the free end of ridge 26, where it again reverses direction for passage through another succession of throttling slots 54, and expansion chambers 30, as previously described. This throttling and expansion process is repeated until the steam enters the inner annular space 68 for entry into the kiln chamber 70.

Grease or other suitable lubricant is injected into the lubricant fitting 64 to provide a reduced friction sliding surface between the sliding plate 34 and the stationary segment 42. This enables limited adjustment or oscillation of the stationary segment 42 by means of the alignment rollers 62.

The annular floating piston ring 66 serves the purpose of reducing the cross sectional area through which the steam traverses, thus reducing steam consumption.

The sequential throttling and expansion of the steam produces a sealing action between the rotatable and stationary segments 18 and 42 respectively, that confines the contents of the rotary kiln to the kiln chamber 70.

In a similar manner, a typical path traversed by the steam to the external atmosphere is through the succession of throttling slots 56 and expansion chambers 52, terminal expansion chamber 58, throttling slots 54, expansion chambers 30, terminal expansion chamber 60 and so on, until the steam enters the outer annular space 72 to exit to the outside atmosphere.

The sequential throttling and expansion steps undergone by the steam on its way to the atmosphere produces a seal that effectively prevents entry of the external atmosphere into the space between the rotatable segment 18 and the stationary segment 42.

The steam, thus flows centrifugally and centripitally through the series of throttling slots 54 and 56, expansion chambers 30 and 52, and terminal expansion chambers 58 and 60, thereby maintaining the integrity of the contents of the rotary kiln 10 by sealing the inner space defined by rotatable body 12 and fixed end 32, to prevent leakage into or out of the equipment.

Although the final discharge pressure of the steam is lower than the input pressure, it preferably exceeds the pressure within the sealing environment and the atmospheric pressure.

Figure 6:
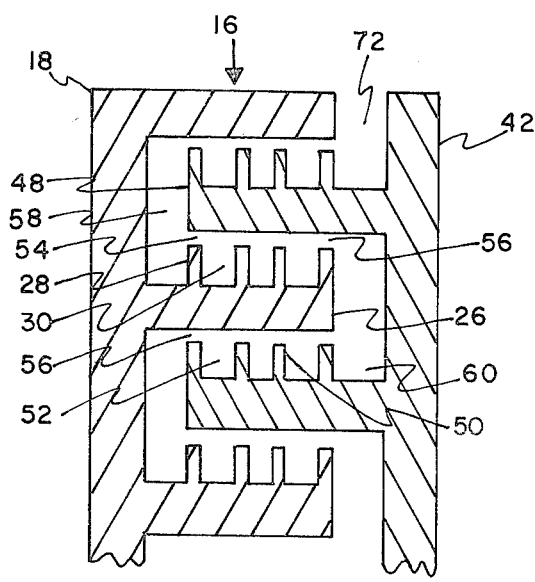
FIGS. 4 to 6 are fragmentary sectional views of other embodiments of the invention shown in simplified schematic form.

As will be apparent to those skilled in the art, the design and configuration of the throttling slots 54 and 56, and expansion chambers 30, 52, 58 and 60 can vary. For example, annular teeth 28 and 50 can have a curved configuration, and the ridges 26 and 48 can also be curved. Additionally, annular teeth 28 and 50 can be formed on the outer radial surface of ridges 26 and 48, respectively, if desired, as shown in FIG. 6. The alignment rollers 62, the annular floating piston ring 66, and annular plate 34 can be omitted if desired, since they are not essential to the operation of the labyrinth seal system.

Figure 4:
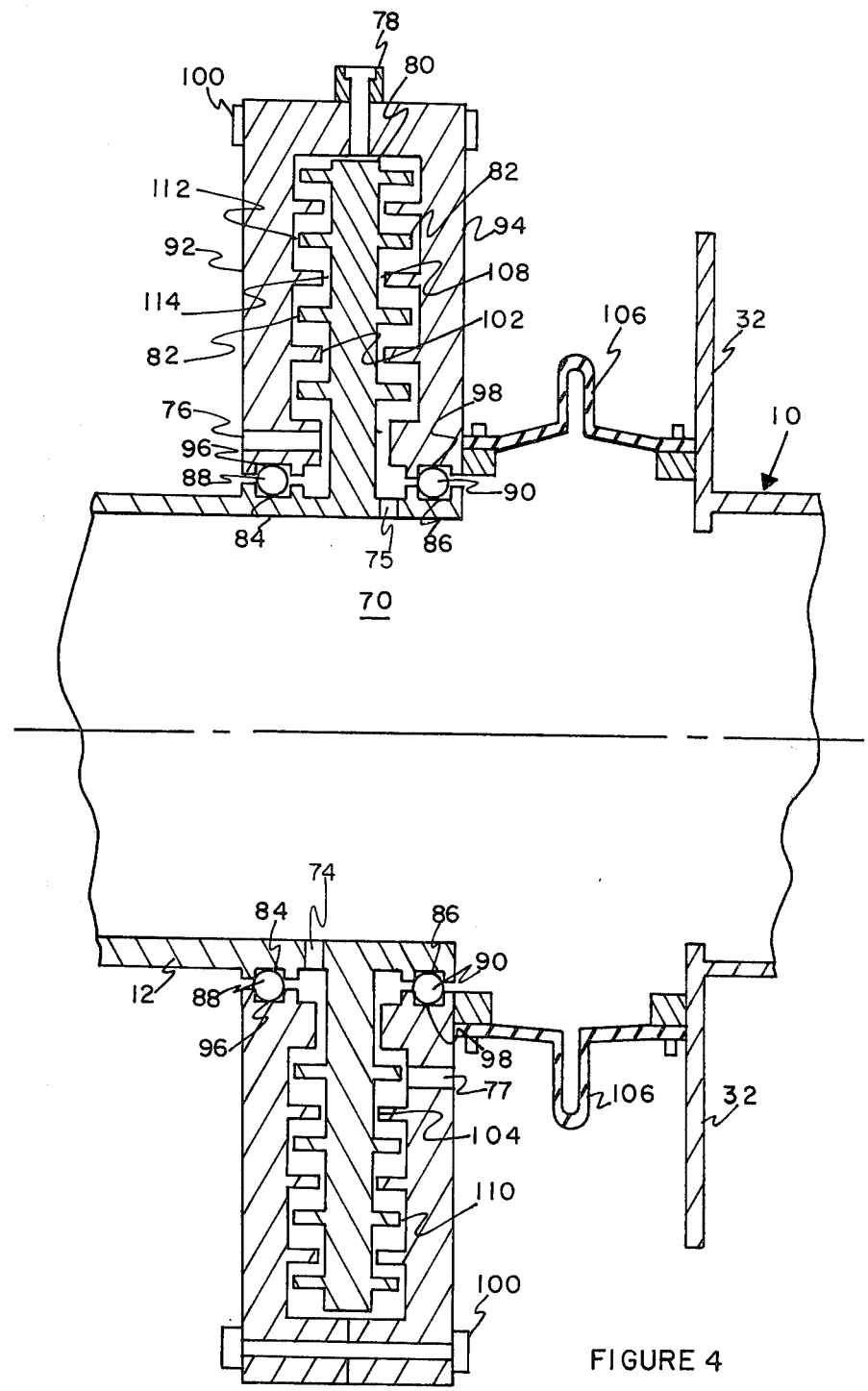

Another embodiment of the invention is shown in the simplified schematic drawing of FIG. 4. Therein, a rotary kiln 10 comprises a cylindrical, rotatable roaster body 12, which has affixed to it, in any suitable manner, an annular rotatable segment 80 formed with a plurality of concentrically spaced ridges 82 projecting from each face of said segment. Although not shown, the ridges 82 are formed with a plurality of annular teeth on the inner radial surface of each ridge, similar to the annular teeth 28 in FIG. 3. Also not shown, the spaces between the teeth define a plurality of expansion chambers and throttling slots similar to corresponding parts 30 and 54 in FIG. 3.

The rotatable roaster body 12 is formed with annular circumferential grooves 84 and 86 on each side of and adjacent to the rotatable segment 80. The annular circumferential grooves 84 and 86 are adapted to receive a plurality of bearings 88 and 90, respectively. Stationary annular segments 92 and 94 are formed with annular grooves 96 and 98, respectively on their inner radial surface. The stationary segments 92 and 94 are mounted on bearings 88 and 90 respectively, which fit into the respective grooves 96 and 98. The stationary annular segments 92 and 94 are joined at their outer periphery by any suitable means, such as with a plurality of mounting bolts 100.

The stationary annular segments 92 and 94 are formed with a plurality of concentrically spaced projecting ridges 102 and 104, respectively, which project into the spaces between the ridges 82 of the rotatable segment 80. Although not shown, the inner radial surface of the ridges 102 and 104 are formed with a plurality of annular teeth on the inner radial surface of each ridge, similar to annular teeth 50 in FIG. 3. Also not shown, the spaces between the teeth define a plurality of expansion chambers and throttling slots similar to corresponding parts 52 and 56 in FIG. 3. The ridges 82 of the rotatable segment 80 project into the spaces between the ridges 102 and 104 of the stationary segments 92 and 94, respectively, forming terminal expansion chambers 108, 110, 112 and 114, similar to corresponding parts 58 and 60 in FIG. 3. The stationary annular segment 94, closest to the fixed end portion 32 of the rotary kiln 10 has affixed to it, by any suitable means (not shown), a flexible, circumferential boot 106, made of a suitable material such as rubber, and the like. The opposite end of the flexible boot 106 is attached to the fixed end portion 32 of the rotary kiln 10 by any suitable known fastening means.

A plurality of openings 74 and 75, which communicate with the inner kiln chamber 70, are located on the rotatable roaster body 12 between rotatable segment 80 and stationary segment 92, and between rotatable segment 80 and stationary segment, respectively. Stationary segments 92 and 94 are formed with a plurality of openings 76 and 77, respectively, which communicate with the outside atmosphere.

A plurality of fluid inlets 78 are located at the peripheral interface of stationary segments 92 and 94, and communicate with the inner space defined by the stationary segments 92 and 94, and rotatable segment 80.

The operation of the labyrinth seal of FIG. 4 is similar to that described in FIGS. 1, 2 and 3. Means are provided for the introduction of a sealing fluid such as steam through fluid inlet 78 into the space defined between rotatable segment 80 and stationary segments 92 and 94, to proved the sealing action. In a manner similar to the operation described for FIGS. 1, 2 and 3, the steam will simultaneously traverse a path into the kiln chamber 70 through the openings 74 and 75, while another portion will traverse a path to the outside atmosphere through the openings 76 and 77. The flexible boot arrangement is especially suitable for low temperature operation.

Figure 5:
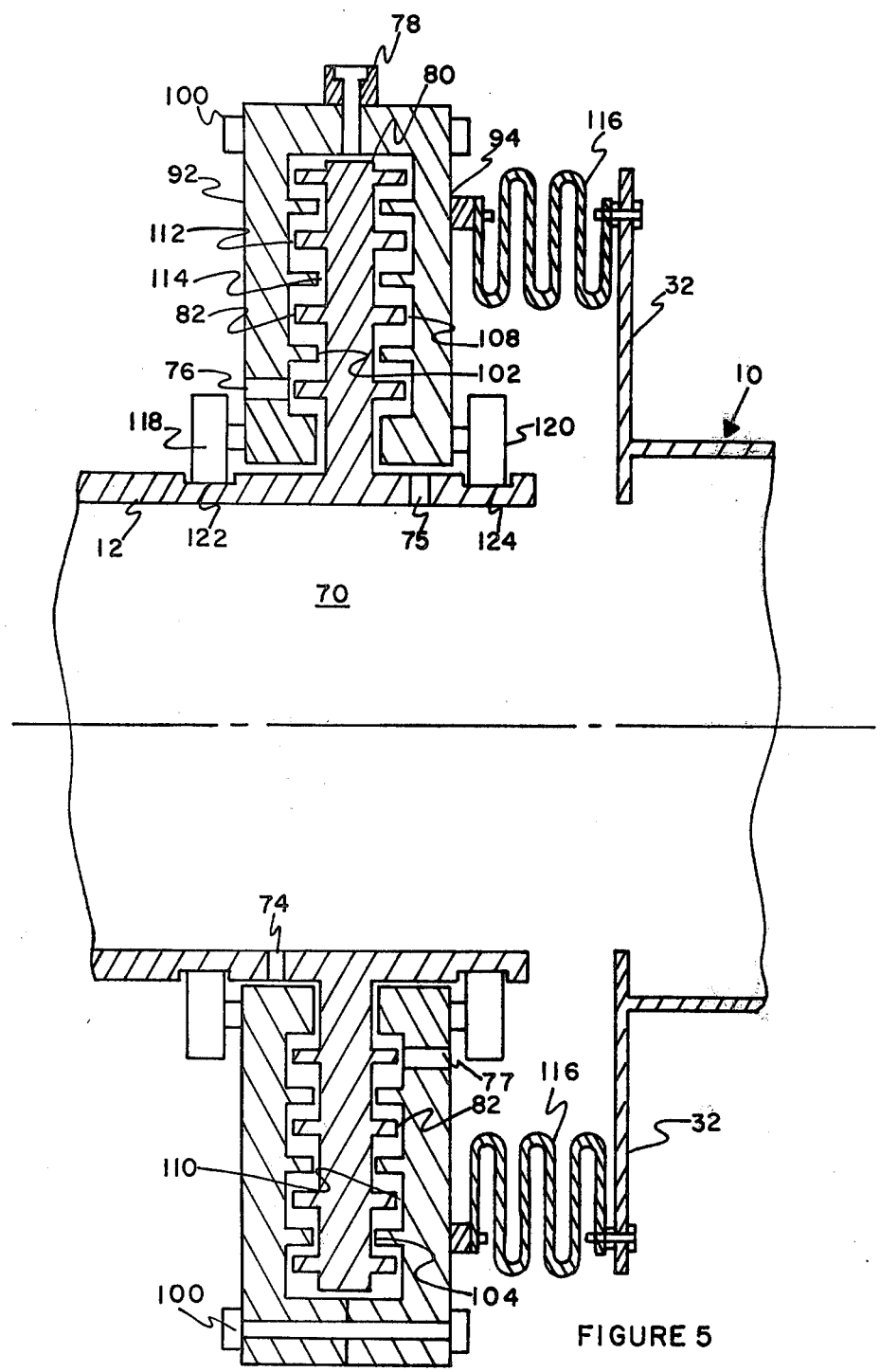

The embodiment shown in FIG. 5 is another simplified schematic drawing of a labyrinth seal similar to that of FIG. 4, except that a flexible bellows 116, made of a suitable material, such as bronze or steel, has been substituted for the flexible boot 106. Additionally, alignment rollers 118 and 120 affixed to the stationary segments 92 and 94, respectively, rotate in the annular grooves 122 and 124 on the roaster body 12 and replace the bearings 88 and 90 which rotate in the grooves 84, 96 and 86, 98, respectively, in FIG. 4.

The operation of this arrangement is similar to that of FIG. 4 and is especially suitable for high temperature applications.

When operational, the described embodiments are capable of preventing leakage of dust and/or gas from rotatable equipment using the labyrinth sealing system of the present invention. The labyrinth sealing system also maintains the integrity of the apparatus contents by interdicting the entry of external dust, air and the like into the apparatus.

The external shape of the labyrinth sealing system should correspond to the apparatus desired to be sealed, such as a circular, cylindrical external configuration, in contemplation of a rotating movement.

The gaseous sealing means can be steam, nitrogen, compressed air and the like, with the proviso that the sealing gas be compatible with and not adversely affect the process or product in the rotatable equipment.

The unique construction and configuration of the labyrinth sealing system of the present invention makes it capable of withstanding greater axial and angular misalignment commonly encountered in rotary heating equipment. Furthermore, it is substantially more durable and maintenance free than those known in the prior art.

Although the labyrinth sealing system of the present invention is contemplated for most frequent implementation in rotating equipment wherein one labyrinth sealing component rotates while the other is stationary, it can be implemented with comparable efficiency on apparatus containing two or more sealing surfaces which rotate at different speeds. A wide variety of rotating equipment, such as dryers, roasters, ovens, kilns, furnaces and the like, are capable of accommodating the labyrinth seals of the present invention.

As various changes can be made in the construction of the labyrinth sealing system without departing from the scope of the invention, it is intended that all matter contained in the above description, or shown in the accompanying drawings shall be interpreted as illustrative and not in a limiting sense.

What is claimed is:

1. A labyrinth sealing system for sealing the inner space of an apparatus defined by two interengaged members wherein one interengaged member is movable with respect to the other interengaged member, said sealing system comprising a first segment projecting from said one interengaged member and formed with a first plurality of concentrically spaced ridges, and a second segment projecting from said other interengaged member and formed with a second plurality of concentrically spaced ridges, wherein the ridges of said first segment are interposed, in noncontacting fashion, in the spaces between the ridges of said second segment, and vice versa, and wherein an annular space is defined between said segments and an annular floating piston ring is disposed in the space between said segments.

* * * * *